June 9, 1964      B. LYMAN      3,136,539
SHEET HANDLING
Filed Dec. 3, 1962
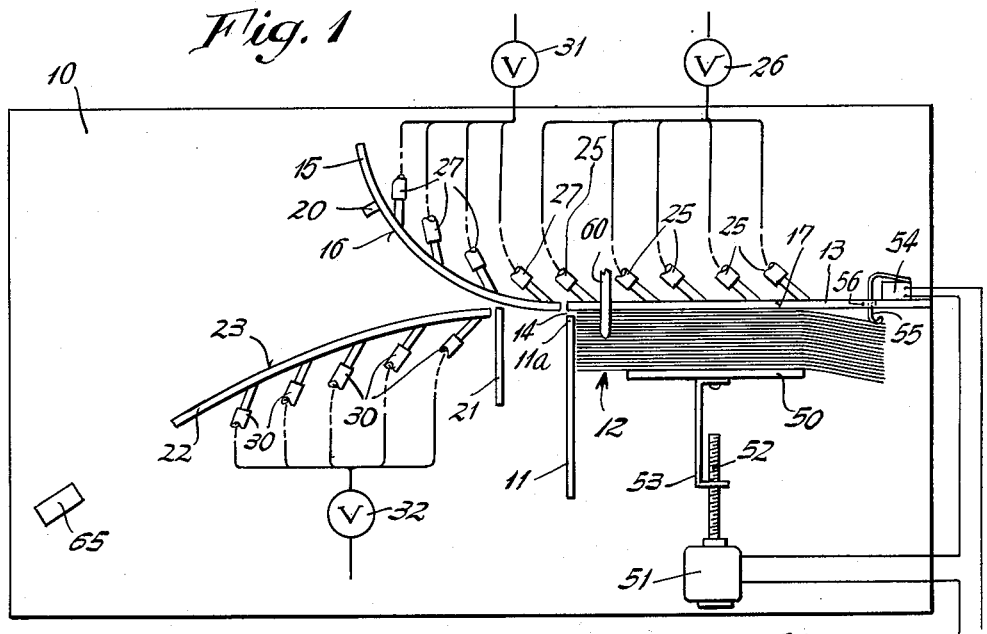
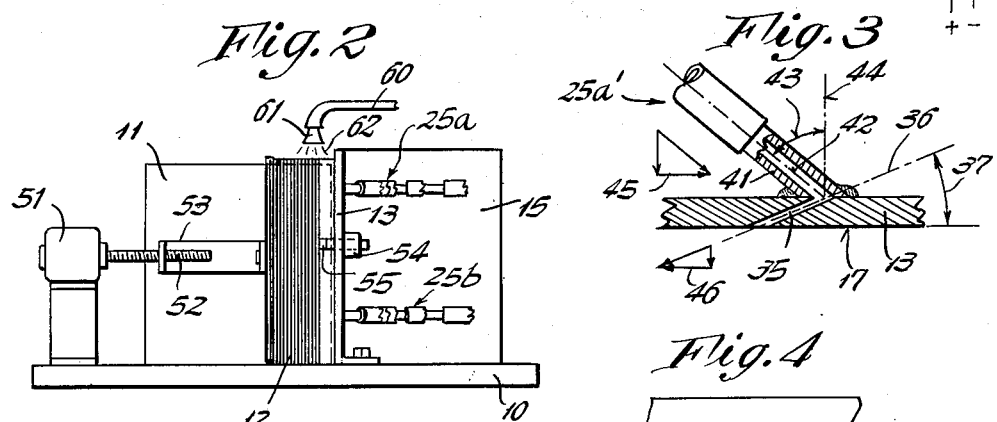
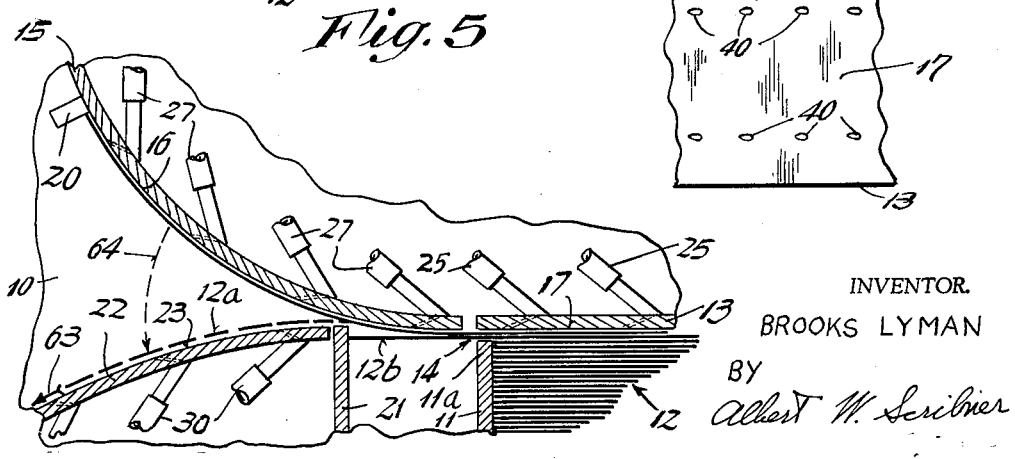
INVENTOR.
BROOKS LYMAN
BY
Albert W. Scribner

United States Patent Office 3,136,539
Patented June 9, 1964

3,136,539
SHEET HANDLING
Brooks Lyman, R.R. 2, Box 7, Pound Ridge, N.Y.
Filed Dec. 3, 1962, Ser. No. 241,769
12 Claims. (Cl. 271—26)

This invention relates to a novel method and apparatus for separating and serially entraining a plurality of sheets or web-like elements. More particularly the invention relates to a novel method and apparatus for aerodynamically separating and feeding a group of work sheets so as to serially deliver the latter to a predetermined station.

Recent developments in the field of sheet feeding make it possible to aerodynamically transport a work sheet such as a paper document or card along a predetermined path defined by a smooth stationary guide surface. This technique is described for example in U.S. Patents 2,953,371 and 2,981,411. Here a relatively thin layer or cushion of air is made to flow between a work sheet and the guide surface whereby the differential air pressure acting on the opposite faces of said work sheet biases the work sheet toward said surface. At the same time the moving air stream exerts a frictional driving force on the sheet so that the latter experiences an endwise feeding movement along said predetermined path defined by the stationary guide surface. This pneumatic sheet transporting technique requires the successive delivery of work sheets usually from a stack to the guide surface and heretofore this delivery function has in most cases been performed by a mechanical and/or a vacuum means. The instant invention contemplates the successive separation and delivery of individual work sheets from a stack of work sheets by utilizing improved and extended techniques for aerodynamically controlling the physical manipulation of said work sheets.

One object of the invention is to provide a novel apparatus having essentially no moving parts for successively applying an aerodynamic separating and feeding force to each of a group of stacked work sheets.

Another object of the invention is to provide an improved technique for separating the leading sheet from a stack of work sheets by aerodynamically displacing just said leading sheet along a predetermined operative bent feed path so that any superimposed work sheet may be moved along a different feed path to an inoperative position.

Another object of the invention is to provide a novel technique for aerodynamically feeding a work sheet over a first guide surface and then over a second guide surface, the sheet being arrested before being moved from the first to the second guide surface.

Another object of the invention is to provide a novel method and apparatus for separating and singly delivering each successive work sheet of a stack of such sheets by successively aerodynamically displacing just the leading work sheet of the stack along a bent first feed path to a predetermined limiting position, and then aerodynamically deflecting the leading end of the sheet laterally into a second feed path along which the sheet is thereafter caused to move.

Another object of the invention is to provide a novel method and apparatus for separating and serially feeding work sheets from a stack of such sheets whereby each successive sheet is flexed first in one lateral direction and then in an opposite lateral direction.

A further object of the invention is to provide a novel method and apparatus for aerodynamically separating and feeding work sheets wherein a transporting air stream is applied first to one side of a sheet and is then applied to the other side of the sheet whereby the serial action of said air streams maintains the motion of each sheet along a predetermined feed route.

Other objects of the invention will become apparent as the disclosure progresses.

In the drawings:
FIG. 1 is a plan view illustrating the structural nature of the instant apparatus;
FIG. 2 is a right end view of the apparatus shown in FIG. 1;
FIG. 3 is a fragmentary partial sectional view illustrating the relative geometric arrangement of the sheet guide surface and one of the air conduit means;
FIG. 4 is a front elevational view of the structure shown in FIG. 3;
FIG. 5 is a fragmentary sectional plan view illustrating the operational nature of the instant apparatus.

A preferred embodiment of the instant invention is illustrated in FIGS. 1 and 2. Here a horizontally disposed base or frame member 10 is provided having fixedly secured thereto a vertical guide plate 11 that is adapted to be engaged by the left end, as seen in FIG. 1, of a stack 12 of work sheets that are to be separated and serially transported endwise along a predetermined route. A vertically disposed work sheet separating plate 13 is fixedly attached to base 10 so as to be substantially normal to the plane of plate 11 and so as to be spaced a slight distance away from the adjacent end 11a of said plate 11 thereby affording a work sheet feed gap 14. A curved vertical plate 15 is secured to base 10 and is provided with a smooth but bent outer guide surface 16, the plate 15 being positioned so that its lower right-hand end, as seen in FIG. 1, is closely adjacent to the left end of the guide plate 13 whereby said guide surface 16 is substantially coextensive with the smooth planar sheet guide surface 17 of said plate 13. The guide surfaces 16 and 17 cooperatively define a first predetermined work sheet feed path along which a sheet may be initially transported, this transporting movement being limited by a stop or abutment member 20 which is mounted on the plate 15 and which extends across said feed path. A vertical doubles arresting abutment plate 21 is fixed on the base 10 and is disposed so as to be substantially parallel to plate 11; the upper or forward end of plate 21, as seen in FIG. 1, extending through the plane of the guide surface 17 and terminating a short distance from the guide surface 16. A vertical plate 22 is also secured to the base 10 and is disposed so that its right end, as seen in FIG. 1, is disposed adjacent to both the said upper end of the doubles arresting plate 21 and the guide surface 16 of plate 15. The smooth outer guide surface 23 of plate 22 may be longitudinally linear or bent and in either case defines a second predetermined work sheet feed path that diverges away from said first feed path defined by said coextensive guide surfaces 16 and 17.

The sheet separating guide plate 13 has a group of individual air conduit means 25 connected thereto each of which pneumatically communicates with a common control valve 26 and the guide surface 17 in a manner to be described. In similar fashion guide plates 15 and 22 are respectively provided with groups of individual air conduit means 27 and 30 which pneumatically communicate with common valves 31, 32 and the guide surfaces 16 and 23 respectively. Each guide plate may be provided with a single longitudinal row of air conduit means or a plurality of such rows depending on the vertical size of the work sheet, plate 13 as illustrated in FIG. 2 being provided with two longitudinal rows 25a and 25b of conduit means. The valves 26, 31 and 32 are sequentially operated by any suitable control means which will produce the hereinafter described operational timing. In that each of the air conduit means for the various plates is constructed and arranged with respect to its associated plate in similar fashion a description of only one such means (25a') will be made in connection with FIGS. 3 and 4. Here the guide plate 13 is formed with a hole or passageway 35 whose axis 36 is disposed at a relatively small angle 37 with respect to the plate guide surface 17. The outer portion of passageway 35 terminates at an elongated port 40 in the guide surface 17 while the other end portion of the passageway pneumatically communicates with the end of a tubular air fitting 41 that is welded or otherwise suitably secured to the rear wall of guide plate 13. The axis 42 of the fitting is disposed at an acute angle 43 with respect to a line 44 normal to the plate guide surface 17. Under these conditions air flowing through the tubular fitting has a horizontal component 45 that is opposite in direction to that of the corresponding component 46 of the air flowing through the passageway 35. This component reversal of air flow has been found to greatly improve the efficiency of establishing and maintaining an effective work sheet transporting air stream along the associated guide surface.

The instant apparatus is provided with any suitable means to bias the stack 12 of work sheets toward the guide surface 17 of plate 13. Such means for example may include a movable stack advancing plate 50 that is driven toward plate 13 by means of a bi-directional motor 51 acting through a lead screw 52 and a threaded bracket 53 connected to the stack advancing plate 50. The motor 51 is connected in series with a normally closed switch 54 which is mounted on plate 13 and which has an operating arm 55 that extends through a suitable plate aperture 56 so as to be engaged by the leading end of the stack of work sheets. As will be apparent when the stack of work sheets fails to hold the switch arm 55 in its displaced condition the stack advancing plate 50 will be advanced by the operation of motor 51 and as soon as the stack displaces switch arm 55 the motor will be shut off. Any suitable switching means may be used to reverse the motor drive direction whereby plate 50 may be retracted during reloading operations.

In order to ruffle the leading work sheets of the stack 12 as they approach the guide surface 17 an air hose 60 and nozzle 61 are provided to direct a continuous stream of air 62 down onto the upper edges of the leading work sheets as seen in FIG. 2. This ruffling action produced by the air stream 62 will maintain the leading work sheets in relatively loose relation and will facilitate relative endwise movement between the sheets.

In the operation of the instant apparatus, the sheet advancing plate 50 is first withdrawn and the stack 12 of work sheets is placed on the base 10 with the left end of the stack engaging the abutment plate 11. The sheet advancing plate 50 will then be advanced so as to lightly bias the stack toward the guide plate 13 whereby the leading work sheet 12a FIG. 5 contacts the guide surface 17. The valves 26 and 31 are turned on and air from a suitable pressure source flows through conduit means 25 and 27 and onto the guide surfaces 17 and 16 respectively. In accordance with aerodynamic principles the air stream tends to flow closely along the guide surfaces 17 and 16 and thereby forms a fluid cushion on which the work sheets may be moved. In experiencing this air stream the leading work sheet 12a, FIG. 5, will be separated from the adjacent sheets by a differential air pressure acting on opposite faces of the sheet and will be frictionally moved endwise through the gap 14 in the direction of movement of the air stream. When the sheet moves onto the guide surface 16, the differential air pressure that is always present on opposite sides of the moving work sheet keeps biasing the latter toward surface 16 so the work sheet follows along the curved or bent guide surface 16 until it is arrested at a predetermined position by the abutment member 20. The leading work sheet 12a in being moved endwise to this arrested position along a predetermined feed path will be only partially withdrawn from the leading end of the stack 12 as illustrated in FIG. 5. The valves 26 and 31 are then turned off and the valve 32 is immediately thereafter turned on so that the differential air pressure tending to bias the work sheet toward the guide surface 16 is thereby terminated and a new and oppositely acting differential air pressure is established by the air stream 63, FIG. 5. Under these aerodynamic conditions the reduced air pressure at the right end, as seen in FIG. 5, of plate 22 will act on the lower side of the closely adjacent portion of the arrested work sheet 12a so as to progressively unwrap the latter from surface 16 whereby the leading end of the work sheet is laterally deflected over onto the guide surface 23 of plate 22 as indicated by arrow 64 of FIG. 5. With the work sheet now biased to a position adjacent the guide surface 23, as indicated by the dotted line in FIG. 5, the frictional driving effect of the air stream 63 will transport the work sheet endwise along a second predetermined feed path determined by the particular longitudinal configuration of the guide surface 23. In this manner the leading work sheet will be transported along said second predetermined feed path and delivered to some remote station diagrammatically illustrated at 65 of FIG. 1. After delivery of the leading work sheet 12a the valve 32 is turned off. At this point one cycle of the instant work sheet handling device has been completed wherein the leading work sheet has been separated from the stack 12 and fed to a remote station and the device is now ready for a second cycle. At the time in the first cycle when the work sheet 12a moved completely off the stack the valves 26 and 31 were in their off conditions. When the valves 26 and 31 are turned on for the initiation of the second cycle of operation the next sheet to be fed will be aerodynamically separated and displaced endwise along the said first bent feed path defined by guide surfaces 17 and 16 and into arresting engagement with the abutment member 20. Thereafter the remaining portion of the second cycle is the same as that for the corresponding portion of said first cycle. Each successive cycle of operation is carried out in similar fashion and in this manner the work sheets in the stack 12 may be successively separated and fed serially to a remote station by aerodynamic forces which are sequentially applied to the work sheets in the above described sequence. The speed at which the valves 26, 31 and 32 are alternately operated will of course determine the piece rate of feed of the sheets.

If for any reason two or more superimposed work sheets are moved endwise together during the start of any cycle only the leading one of such a plurality of superimposed sheets will be thereafter deflected and fed endwise along the bent guide surface 16. This results from the fact that only the leading one of the superimposed worked sheets will remain aerodynamically biased against the bent guide surface 16 while the next work sheet 12b FIG 5 is isolated pressurewise from the air stream by the deflected leading one of said sheets and hence the said next sheet will not follow along the first bent feed path defined by guide surface 16. Here the next superimposed work sheet will during the motion of the leading sheet be frictionally driven along an inoperative straight line path until it engages the arresting plate 21 as illustrated in FIG. 5. When the next cycle of operation of the device is initiated the now leading one, 12b, of the remaining superimposed work sheets will be aerodynamically biased and displaced by the air stream flowing over the guide surfaces 16 and 17. In this manner any superimposed work sheets that are displaced into engagement with the doubles arresting plate 21 are assured of being sequentially separated, entrained and delivered in serial fashion in the same manner as described for normal sheet manipulation cycles.

It will be seen that the instant work sheet separating and feeding device has no moving parts other than that which might be required to bias the stack 12 toward the sheet separating plate 13 and even this latter function as well as the air valving and control means may be produced by aerodynamic techniques and elements that involve no moving parts. Several prototypes similar to that described have been constructed for handling various size work sheets and in each case the respective devices after being properly tuned have operated efficiently and reliably to serially deliver work sheets from a stack at rates of 100 pieces per minute and higher. Once adjusted for any given set of operating conditions the principal portions of the instant apparatus will function for indefinite periods and none of the elements wear out or need replacement in the usual sense of the word. As will be apparent the entire apparatus shown in FIGS. 1 and 2 may be oriented so that the individual stacked work sheet 12a, 12b, etc. are disposed in or at an acute angle with respect to a horizontal plane rather than in a vertical plane as illustrated.

Since many changes could be made in the embodiment of the invention as particularly described and shown herein without departing from the scope of the invention, it is intended that this embodiment be considered as exemplary and that the invention not be limited except as warranted by the following claims.

What is claimed is:

1. In a sheet handling means;
a first stationary guide member having a guide surface formed thereon,
air conduit means for directing a layer of moving air over said guide surface so that each of a plurality of sheets may be thereby transported along a predetermined sheet feed path determined by said guide surface,
means positioned adjacent the downstream end of said guide surface for interfering with the said transporting movement of each sheet as the latter moves along said path,
a second stationary guide member having a guide surface formed thereon, an initial portion of the second mentioned guide surface being laterally offset from said downstream end of said first mentioned guide surface whereby the leading end of each sheet fed over the first mentioned guide surface may be deflected onto the second mentioned guide surface,
air conduit means for directing a layer of air along the second mentioned guide surface so as to be capable of effecting said deflection of the leading end of each sheet from said first mentioned guide surface to said second mentioned guide surface and to transport each deflected sheet along said second mentioned surface, and
control means operated in predetermined sequence for initiating and terminating the flow of air through at least one of said air conduit means so that each sheet may be transported along said first mentioned guide surface and then along said second mentioned guide surface.

2. Apparatus as defined by claim 1 wherein at least a portion of said first mentioned guide surface is contoured so as to define a bent first feed path.

3. Apparatus as defined by claim 2, additionally comprising
a pack supporting plate transversely disposed with respect to said first guide surface, and
a doubles arresting member having an abutment surface disposed adjacent to said contoured surface portion and in transverse relation to the bent sheet feed path so as to arrest any sheet that is not following along the said bent feed path.

4. A sheet handling device comprising;
means for supporting a stack of sheets that are to be separated and serially fed endwise along a predetermined feed path,
a first guide member having a sheet guide surface formed thereon,
means for separating a sheet from said stack and for aerodynamically transporting the same along said guide surface,
means for preventing any superpositionment of sheets that are fed over said guide surface,
means permitting movement of each sheet to a limiting position along said guide surface,
a second guide member having formed thereon a sheet guide surface that has an initial portion disposed adjacent the said limiting position, and
means for aerodynamically deflecting a sheet that has moved to said limiting position onto the said initial portion of the second mentioned guide surface and for transporting the deflected sheet along said second mentioned guide surface.

5. Apparatus as defined by claim 4 wherein at least a portion of said first mentioned guide surface is contoured so as to change the direction of movement of a sheet being transported, and wherein the sheet superpositionment preventing means includes a transverse abutment member that is effectively disposed adjacent said contoured portion of said first mentioned guide surface so as to arrest any sheet which is not following along said predetermined feed path.

6. In a sheet handling apparatus;
a first transport means for aerodynamically feeding a sheet endwise along a first predetermined feed path,
an abutment member disposed in said path so as to arrest at a predetermined position a sheet that is being fed along said path,
a second transport means for aerodynamically feeding a sheet along a second predetermined path, a portion of said second transport means being arranged to laterally deflect the leading end of an arrested sheet in said first path into said second predetermined path, and
means for sequentially operating said first and second transport means.

7. Apparatus as defined by claim 6 wherein the predetermined arrested position is located such that the distance through which a sheet moves in being fed endwise along said first path to said arrested position is less than the endwise dimension of the sheet.

8. Apparatus as defined by claim 6 wherein at least a portion of said first predetermined path is bent and said abutment member is arranged so as to arrest a sheet while the latter is in a bent condition, and wherein the initial portion of said second transport means is disposed adjacent to the bent portion of said path whereby upon operation of said second transport means the leading end of said arrested sheet is pneumatically progressively withdrawn from said first path and laid out in said second path by means of a differential air pressure acting on the laterally opposite sides of said document.

9. Apparatus as defined by claim 8, additionally comprising means for arresting any sheet that is not following along the bent portion of said first predetermined path.

10. A sheet feeding means; comprising
a frame,
means on said frame for supporting a stack of sheets to be serially transported,
a first guide means disposed adjacent the stack supporting means and fixedly secured to said frame, one portion of said guide means being formed with a substantially flat first wall surface while another portion of said guide means is formed with a second wall surface which is disposed at an angle with respect to said first wall surface, said wall surfaces cooperatively defining a first predetermined bent sheet feed path,
air conduit means cooperating with said wall surfaces for directing a first stream of air over said wall surfaces which is capable of transporting successive sheets endwise along said feed path,
an abutment member for arresting each sheet at a predetermined point along said first path, a doubles arresting member for arresting any sheet that is not following along the bent portion of said first feed path, a second guide means fixedly mounted on said frame and having guide surfaces formed thereon which define a second predetermined sheet feed path, the initial portion of said guide surfaces being disposed adjacent the arrested position of the sheets along said first sheet feed path, air conduit means cooperating with said guide surfaces for directing a second stream of air over said guide surfaces which is capable of transporting a sheet along said second predetermined feed path, and control means for terminating said first air stream when a sheet is at said predetermined point along said first feed path and for initiating said second air stream to progressively draw the sheet from said predetermined arrested point in said first feed path into said second feed path and to then transport said sheet along said second feed path.

11. In an aerodynamic sheet feeding device, a guide member having formed thereon a guide surface over which sheets are to be successively fed, air conduit means for establishing a transporting stream of air along said surface, the terminl portion of said conduit means being defined by a passageway having a center line that is disposed at an acute angle with respect to said guide surface so that the air flowing through said passageway has a component of movement in the same direction as that for the air stream moving over said surface, and the portion of said conduit means immediately upstream from said terminal portion having a center line that is angularly disposed with respect to the first mentioned center line whereby the air flowing through said upstream portion of the conduit means has a component of movement in a direction opposite from that of said air stream whereby the air flowing through said conduit portions effectively passes around a corner before moving onto said guide surface.

12. A method of aerodynamically handling work sheets; comprising the steps of establishing a first stream of air on one side of a work sheet to be fed and directing said stream along a predetermined bent path so as to transport said sheet endwise along said bent path, arresting the sheet at a predetermined position along said bent path, terminating said first stream of air and establishing a second stream of air on the other side of the arrested sheet and directing said second stream along a second predetermined path so that the said arrested sheet is progressively drawn out of said bent path and into said second predetermined path whereby said sheet may be aerodynamically transported along said second predetermined path by said second air stream.

References Cited in the file of this patent
UNITED STATES PATENTS

| | | |
|---|---|---|
| 2,791,424 | Noon | May 7, 1957 |
| 2,805,898 | Willis | Sept. 10, 1957 |
| 3,103,850 | Khoury et al. | Sept. 17, 1963 |